(12) United States Patent
Noguchi

(10) Patent No.: US 8,553,089 B2
(45) Date of Patent: Oct. 8, 2013

(54) IMAGING DEVICE AND SIGNAL PROCESSING CIRCUIT FOR THE IMAGING DEVICE

(75) Inventor: Tomoyuki Noguchi, Osaka (JP)

(73) Assignee: Panasonic Corporation, Osaka (JP)

( * ) Notice: Subject to any disclaimer, the term of this patent is extended or adjusted under 35 U.S.C. 154(b) by 125 days.

(21) Appl. No.: 13/070,243

(22) Filed: Mar. 23, 2011

(65) Prior Publication Data

US 2011/0169984 A1 Jul. 14, 2011

Related U.S. Application Data

(63) Continuation of application No. PCT/JP2009/004448, filed on Sep. 9, 2009.

(30) Foreign Application Priority Data

Oct. 7, 2008 (JP) ................................. 2008-260435

(51) Int. Cl.
*H04N 5/30* (2006.01)
*H04N 5/33* (2006.01)
(52) U.S. Cl.
USPC .......................................... 348/162; 348/164

(58) Field of Classification Search
USPC ................... 348/E09.053, E05.59, 162, 164, 348/216.1, 234–237, 143; 250/208.1
See application file for complete search history.

(56) References Cited

U.S. PATENT DOCUMENTS

| | | | | |
|---|---|---|---|---|
| 7,821,552 B2* | 10/2010 | Suzuki | ........................ | 348/272 |
| 7,911,528 B2* | 3/2011 | Kawada | ........................ | 348/360 |
| 2007/0183657 A1* | 8/2007 | Kidono et al. | ................ | 382/162 |
| 2008/0049115 A1* | 2/2008 | Ohyama et al. | ............. | 348/222.1 |
| 2009/0215220 A1* | 8/2009 | Toda | .............................. | 438/87 |

FOREIGN PATENT DOCUMENTS

| | | |
|---|---|---|
| JP | 2004-032243 | 1/2004 |
| JP | 2006-148690 | 6/2006 |
| JP | 2008-005213 | 1/2008 |
| JP | 2008-092510 | 4/2008 |

* cited by examiner

*Primary Examiner* — Tuan Ho
*Assistant Examiner* — Chan Nguyen
(74) *Attorney, Agent, or Firm* — McDermott Will & Emery LLP

(57) ABSTRACT

The present invention switches to and from generation of a luminance signal based on a visible light pixel signal and generation of a luminance signal based on a near infrared light pixel signal depending on a result of comparison of signal levels of the visible light pixel signal and the near infrared light pixel signal.

23 Claims, 9 Drawing Sheets

$$\begin{cases} \text{formula}(1): Y = 0.299 \times R + 0.587 \times G + 0.114 \times B \\ \text{formula}(2): U = -0.147 \times R - 0.289 \times G + 0.436 \times B \\ \text{formula}(3): V = 0.615 \times R - 0.515 \times G - 0.100 \times B \end{cases}$$

$$\begin{cases} \text{formula}(4): Y = IR \\ \text{formula}(5): U = -0.147 \times R - 0.289 \times G + 0.436 \times B \\ \text{formula}(6): V = 0.615 \times R - 0.515 \times G - 0.100 \times B \end{cases}$$

IMAGING DEVICE AND SIGNAL PROCESSING CIRCUIT FOR THE IMAGING DEVICE

CROSS REFERENCE TO RELATED APPLICATIONS

This is a continuation of PCT International Application PCT/JP2009/004448 filed on Sep. 9, 2009, which claims priority to Japanese Patent Application No. 2008-260435 filed on Oct. 7, 2008. The disclosures of these applications including the specifications, the drawings, and the claims are hereby incorporated by reference in their entirety.

FIELD OF THE INVENTION

The present invention relates to an imaging device comprising an imaging element provided with a plurality of pixels have a sensitivity to wavelength regions of visible light and near infrared light, wherein a luminance signal and a color signal are generated from a visible light pixel signal and a near infrared light pixel signal, and a signal processing circuit for the imaging device.

DESCRIPTION OF THE RELATED ART

The entire documents of Japanese patent application No. 2008-260435 filed on Oct. 7, 2008, which include the specification, drawings, and scope of claims, are incorporated herein by reference.

A solid imaging element, such as a CCD (charge coupled device) image sensor, is conventionally provided with color filters to obtain color images (for example, primary color filters which transmit therethrough three primary colors, red, green, and blue). The color filters make a particular light having a certain wavelength band in the visible light (wavelength: approximately 380 nm-770 nm) enter a light receiving element (photo diode).

The color filters have a degree of light transmissivity for near infrared light (wavelength: approximately 800 nm-900 nm), and the light receiving element has a sensitivity not only to the visible light wavelength region but also to the infrared light wavelength region. Therefore, a part of the infrared light having entered the color filters is received by the light receiving element. To block any unwanted infrared light, a digital camera, for example, is provided with an IR (Infra Red) cut filter on the side of a plane of incidence of the solid imaging element.

The range of application of the solid imaging element is increasingly broadened in recent years, for example, the solid imaging element is now actively used as a light receiving sensor for receiving the near infrared light. There is a conventional technique, wherein near infrared light emitted from a light emitter is irradiated on a photographic subject to receive the light reflected from the photographic subject so that information of a distance to the photographic subject is obtained (for example, see the Patent Document 1). More specifically, the visible light and the near infrared light are received in a single-plate structure, and a color image is obtained from the visible light and the distance information is obtained from the near infrared light at the same time to optimally set an exposure time. According to the technique, the exposure time can be controlled independently for the visible light and the near infrared light.

An imaging element illustrated in FIG. 9 has a pixel P1 having a sensitivity to a red wavelength region (R), a pixel P2 having a sensitivity to a green wavelength region (G), a pixel P3 having a sensitivity to a blue wavelength region (B), and a pixel P4 having a sensitivity to a near infrared wavelength region (IR). The imaging element generates a luminance signal and a color signal from the visible light wavelength region, and generates a near infrared light pixel signal (IR) for obtaining the distance information from the near infrared wavelength region.

PRIOR ART DOCUMENT

Patent Document

Patent Document 1: Unexamined Japanese Patent Applications Laid-Open No. 2008-5213

SUMMARY OF THE INVENTION

Problem to be Solved by the Invention

The conventional technique uses the near infrared light pixel signal for measuring the distance alone, and always generates the color image from the visible light. According to the technical characteristic, the sensitivity of the imaging element is inadequately low in a dark environment, for example, at night because there is less visible light, thereby failing to obtain a clear color image. The imaging element, particularly when used in an in-vehicle camera or a monitor camera, provides a poor visibility for a user, and it is desirable to solve the technical problem.

The present invention was accomplished to solve the conventional technical problem, and provides an image device capable of capturing a clear color image when a photographic subject is photographed in a dark environment.

Means for Solving the Problem

1) An imaging device according to the present invention is configured to switch to and from generation of a luminance signal based on a visible light pixel signal and generation of a luminance signal based on a near infrared light pixel signal depending on a result of comparison of signal levels of the visible light pixel signal and the near infrared light pixel signal.

2) More specifically, an imaging device according to the present invention comprises:

an imaging element capable of outputting a visible light pixel signal and a near infrared light pixel signal;

a YC processing unit capable of generating a luminance signal and a color signal from the visible light pixel signal and the near infrared light pixel signal; and a visible light/near infrared light dominance determination unit configured to compare signal levels of the visible light pixel signal and the near infrared light pixel signal and switch to and from generation of the luminance signal based on the visible light pixel signal and generation of the luminance signal based on the near infrared light pixel signal depending on a comparison result thereby obtained.

3) In the imaging device, the YC processing unit preferably comprises:

a first processing configuration for signal generation suitable for the generation of the luminance signal based on the visible light pixel signal outputted from the imaging element during daytime or in a first photographing environment substantially as bright as the daytime; and a second processing configuration for signal generation suitable for the generation of the luminance signal based on the near infrared light pixel signal outputted from the imaging element in a second photographing environment darker than the first photographing environment, wherein the visible light/near infrared light dominance determination unit switches to and from the first processing configuration for signal generation and the second processing configuration for signal generation in the YC processing unit depending on the comparison result of the signal levels of the visible light pixel signal and the near infrared light pixel signal.

The signal level of the visible light pixel signal and the signal level of the near infrared light pixel signal are compared to each other, and one of the first processing configuration for signal generation and the second processing configuration for signal generation in the YC processing unit is selected depending on the comparison result. According to the technical characteristic, the processing configuration for generating the luminance signal is automatically changed depending on the comparison result of the signal levels of the visible light pixel signal and the signal level of the near infrared light pixel signal. When, for example, the signal level of the visible light pixel signal is larger than that of the near infrared light pixel signal, providing a photographing environment relatively bright, the luminance signal and the color signal are generated based on the visible light pixel signal. On the other hand, when the signal level of the visible light pixel signal is smaller than that of the near infrared light pixel signal, providing a photographing environment relatively dark, the color signal is generated based on the visible light pixel signal, while the luminance signal is generated based on the near infrared light pixel signal.

By switching to and from the different processing configurations for signal generation, the luminance signal and the color signal are both generated based on the visible light pixel signal in the bright environment, whereas the color signal is generated from the visible light pixel signal and the luminance signal is generated from the near infrared light pixel signal in the dark environment. There are more near infrared light components than the visible light components in any dark environment. Therefore, the luminance signal generated from the near infrared light pixel signal has a larger signal level. When the luminance signal is thus differently generated after the brightness level of the photographing environment is grasped, a clear color image can be obtained in the dark environment where the signal level of the visible light pixel signal is smaller than that of the near infrared light pixel signal, and a user can have a better visibility.

4) In the imaging device, the imaging element preferably comprises:

a plurality of first pixels having a sensitivity to a visible light wavelength region and configured to output the visible light pixel signal; and a plurality of second pixels having a sensitivity to a near infrared light wavelength region and configured to output the near infrared light pixel signal, wherein the first pixels include:
a pixel having a sensitivity to a red visible light;
a pixel having a sensitivity to a green visible light; and
a pixel having a sensitivity to a blue visible light.

The imaging element used in the imaging device thus technically characterized has the pixels provided with color filters having transmissivity for the visible light wavelength regions of three primary colors, red, green, and blue, and the pixel provided with a color filter having transmissivity for the wavelength region of the near infrared light.

In the case where the signal level of the visible light pixel signal is equal to that of the near infrared light pixel signal, either of the two options can be chosen.

5) In the imaging device, the imaging element preferably comprises:

a plurality of first pixels having a sensitivity to a visible light wavelength region and configured to output the visible light pixel signal; and a plurality of second pixels having a sensitivity to a near infrared light wavelength region and configured to output the near infrared light pixel signal, wherein the second processing configuration for signal generation includes:

a 2-1 processing configuration for signal generation in which the luminance signal is generated based on the near infrared light pixel signal read per pixel from the second pixels, and the color signal is generated based on the visible light pixel signal read per pixel from the first pixels; and a 2-2 processing configuration for signal generation in which the luminance signal is generated based on the near infrared light pixel signal read per pixel from the second pixels, and the color signal is generated based on the visible light pixel signal read from a mixing result obtained by mixing a target pixel with a surrounding pixel thereof both selected from the first pixels, and the visible light/near infrared light dominance determination unit requests the YC processing unit to switch to the 2-1 processing configuration for signal generation when the signal level of the visible light pixel signal is equal to or smaller than the signal level of the near infrared light pixel signal and the signal level of the visible light pixel signal is larger than a given threshold value, and the visible light/near infrared light dominance determination unit requests the YC processing unit to switch to the 2-2 processing configuration for signal generation when the signal level of the visible light pixel signal is equal to or smaller than the signal level of the near infrared light pixel signal and the signal level of the visible light pixel signal is equal to or smaller than the given threshold value.

The imaging device preferably further comprises:
a readout configuration switching unit; and
a visible light threshold determination unit, wherein
the readout switching control unit comprises:
a first readout configuration in which the visible light pixel signal and the near infrared light pixel signal are read per pixel from the imaging element; and a second readout configuration in which the visible light pixel signal and the near infrared light pixel signal are read from a mixing result obtained by mixing a target pixel with a surrounding pixel thereof both selected from the imaging element, and the readout switching control unit switches to and from the first readout configuration and the second readout configuration, and the visible light threshold determination unit requests the readout switching control unit to switch to the first readout configuration and requests the YC processing unit to switch to the 2-1 processing configuration for signal generation when the signal level of the visible light pixel signal is equal to or smaller than the signal level of the near infrared light pixel signal and the signal level of the visible light pixel signal is larger than a given threshold value, and when the signal level of the visible light pixel signal is equal to or smaller than the signal level of the near infrared light pixel signal and the signal level of the visible light pixel signal is equal to or smaller than the given threshold value, the visible light threshold determination unit requests the readout switching control unit to switch to the first readout configuration and requests the YC processing unit to switch to the 2-1 processing configuration for signal generation in order to generate the luminance signal, and the visible light threshold determination unit requests the readout switching control unit to switch to the second readout configuration and requests the YC processing unit to switch to the 2-2 processing configuration for signal generation in order to generate the color signal.

The visible light threshold determination unit compares the signal level of the visible light pixel signal to the given threshold value, and transmits the determination result to the readout switching control unit and the YC processing unit. The readout switching control unit selects one of the readout configurations to read the pixel signal depending on the received determination result, and the YC processing unit selects one of the processing configurations for signal generation to generate the luminance signal and the color signal depending on the received determination result. When the signal level of the visible light pixel signal is relatively small as compared to that of the near infrared light pixel signal (the photographing environment is relatively dark), the signal level of the visible light pixel signal may be larger or smaller than the given threshold value. The photographing environment may not be too dark in the former, however, it is unquestionably too dark in the latter.

When the signal level of the visible light pixel signal is larger than the given threshold value, the visible light threshold determination unit preferably requests the respective units as follows.

The visible light threshold determination unit requests the readout switching control unit to switch to the per-pixel readout (first readout configuration)

The visible light threshold determination unit requests the YC processing unit to switch to the generation of the luminance signal based on the near infrared light pixel signal read per pixel from the imaging element, and switch to the generation of the color signal based on the visible light pixel signal read per pixel from the imaging element (2-1 processing configuration for signal generation). This technical characteristic is similar to 3).

When the signal level of the visible light pixel signal is equal to or smaller than the given threshold value (the photographing environment is too dark), the visible light threshold determination unit preferably requests the respective units as follows.

To generate the luminance signal, the visible light threshold determination unit requests the readout switching control unit to switch to the per-pixel readout (first readout configuration), and requests the YC processing unit to the generation of the luminance signal based on the near infrared light pixel signal read per pixel from the imaging element (2-1 processing configuration for signal generation.

To generate the color signal, the visible light threshold determination unit requests the readout switching control unit to switch to the readout configuration in which the pixel signal is read from the mixing result obtained by mixing the target pixel with its surrounding pixel (second readout configuration).

To generate the color signal, the visible light threshold determination unit requests the YC processing unit to switch to the generation of the color signal based on the visible light pixel signal read from the pixel mixing result (2-2 processing configuration for signal generation).

Though the color signal thus generated has a rather poor image resolution because of mixing the pixels, it is not much of a problem because human eyes are not so sensitive to the color signal as to the luminance signal. The minor disadvantage is outweighed by the fact that the color signal thus obtained includes less noise because the visible light pixel signal can be more generated from the pixel mixing result. As a result, a relatively good color image can be obtained.

The analog pixel signal of near infrared light is thus obtained per pixel ordinarily because there are more near infrared light components at night when there is less visible light, making it unnecessary to mix the pixels. Because the near infrared light pixel signal is thus obtained per pixel; there is no risk of deteriorating the image resolution of the luminance signal generated from the near infrared light pixel signal.

Thus, the color signal can be most suitably generated depending on whether the signal level of the visible light pixel signal is larger or smaller than the given threshold value. In a photographing environment too dark with less visible light, for example, during nighttime, the imaging element can have a certain degree of sensitivity so that an image with an acceptably good image quality can be obtained. The imaging element, particularly when used in an in-vehicle camera or a monitor camera, provides a better visibility for a user.

In the case where the signal level of the visible light pixel signal is equal to the given threshold value, either of the two options can be chosen.

6) In the imaging device, the YC processing unit preferably comprises a 2-3 processing configuration for signal generation in place of the 2-2 processing configuration for signal generation, wherein the luminance signal is generated based on the near infrared light pixel signal read per pixel from the second pixels, and the color signal is generated based on the visible light pixel signal read from the first pixels after a prolonged exposure to light in the 2-3 processing configuration for signal generation.

The basic operational effect obtained by this technical characteristic is similar to 5). Below are described a few differences to 5). When the signal level of the visible light pixel signal is smaller than the given threshold value in the too dark photographing environment, the visible light threshold determination unit requests the readout switching control unit to switch to the readout per pixel and requests the YC processing unit to generate the luminance signal using the near infrared light pixel signal read per pixel in order to generate the luminance signal. To generate the color signal, the visible light threshold determination unit requests the readout switching control unit to read the pixel signal after the prolonged exposure to light and requests the YC processing unit to generate the color signal using the visible light pixel signal obtained by the post-exposure readout. Because of the prolonged exposure to light, the pixel signal is not generated over a long period of time when the color signal is generated, which deteriorates an update rate of the color signal. However, this is not a major issue because human eyes are not so sensitive to the color signal as to the luminance signal. The minor disadvantage is outweighed by the fact that the visible light pixel signal can be more generated through the prolonged exposure to light. As a result, a color image with a relatively good image quality can be obtained.

The near infrared light pixel signal is obtained per pixel without the prolonged exposure to light because there are more near infrared light components at night when there is less visible light, making such a prolonged exposure to light unnecessary. Because the near infrared light pixel signal is thus obtained in the conventional manner, there is no risk of deteriorating the update rate of the luminance signal generated from the near infrared light pixel signal.

The color signal can be thus most suitably generated depending on whether the signal level of the visible light pixel signal is larger or smaller than the given threshold value. In a photographing environment too dark with less visible light, for example, during nighttime, the imaging element can have a certain degree of sensitivity so that an acceptably good image can be obtained. The imaging element, particularly when used in an in-vehicle camera or a monitor camera, provides a better visibility for a user.

In the case where the signal level of the visible light pixel signal is equal to the given threshold value, either of the two options can be chosen 7) A signal processing circuit for the imaging device according to the present invention is configured to switch to and from generation of a luminance signal based on a visible light pixel signal and generation of a luminance signal based on a near infrared light pixel signal depending on a result of comparison of signal levels of the visible light pixel signal and the near infrared light pixel signal.

The signal processing circuit for the imaging device according to the present invention is applicable to any arbitrary imaging device comprising an imaging element including pixels having a sensitivity to wavelength regions of visible light and near infrared light.

Effect of the Invention

According to the present invention, changes of a brightness level of a photographing environment are detected, and the luminance signal is differently generated depending on the detected current brightness level. This technical advantage enables a clear color image to be obtained in any dark environment where the signal level of the visible light pixel signal is smaller than the signal level of the near infrared light pixel signal, thereby improving a degree of visibility for a user.

EXEMPLARY EMBODIMENTS FOR CARRYING OUT THE INVENTION

Figure 1:
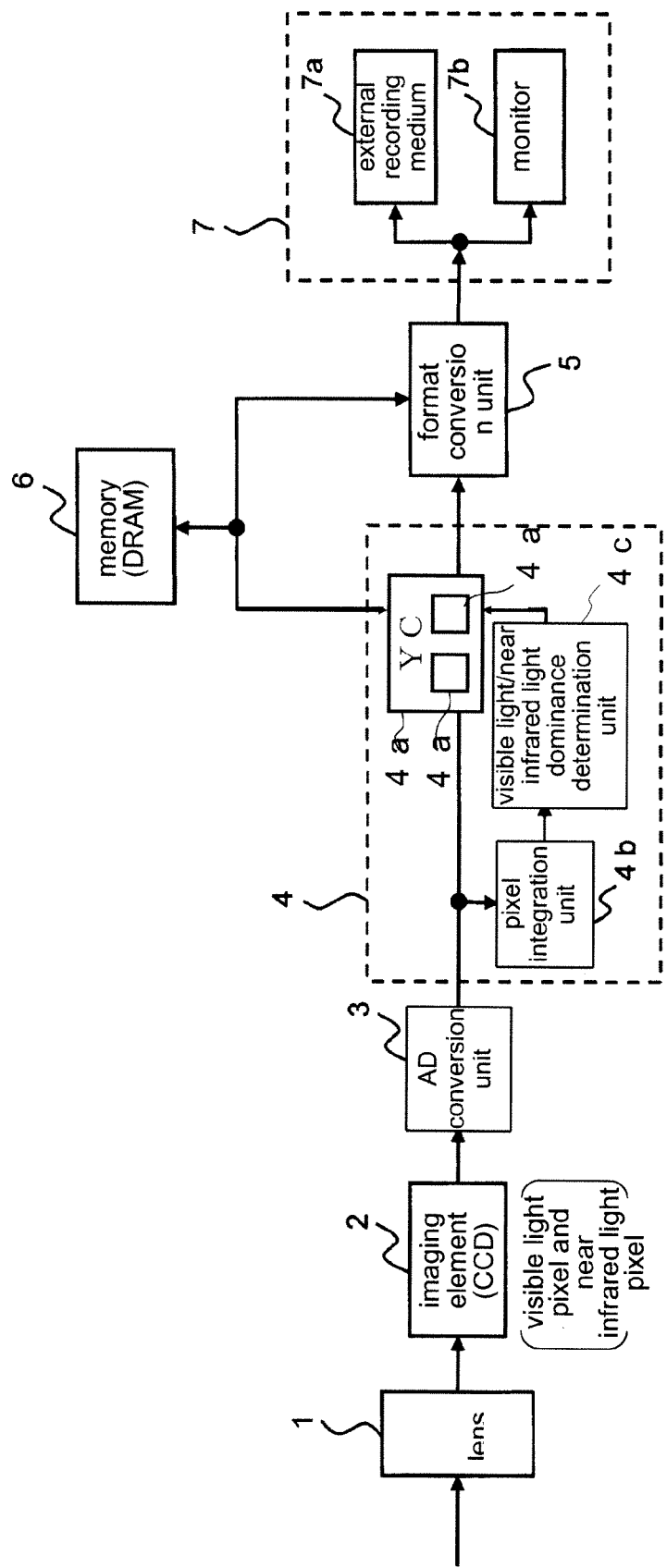
FIG. 1 is a block diagram illustrating a structural characteristic of an imaging device according to an exemplary embodiment 1 of the present invention.

Hereinafter, exemplary embodiments of an imaging device and a signal processing circuit for the imaging device according to the present invention are described in detail referring to the drawings.

Exemplary Embodiment 1

An imaging device according to an exemplary embodiment 1 of the present invention is configured to generate a luminance signal from visible light in a bright photographing environment and generate the luminance signal from near infrared light in a dark photographing environment.

FIG. 1 is a block diagram illustrating a structural characteristic of the imaging device according to the exemplary embodiment 1. The imaging device comprises an optical lens 1, a solid imaging element 2, an AD conversion unit 3, a signal processor 4, a format conversion unit 5, and a memory 6. The imaging device is connected to an external device 7 comprising an external recording medium 7a and a monitor 7b.

The solid imaging element 2 includes a CCD image sensor. The solid imaging element 2 includes a plurality of pixels having a sensitivity to wavelength regions of visible light (wavelength: approximately 380 nm-770 nm) and near infrared light (wavelength: approximately 800 nm-900 nm). The solid imaging element 2 is disposed behind the optical lens 1. The AD conversion unit 3 converts an analog pixel signal obtained by the imaging element 2 into a digital pixel signal. In the description given below to the present exemplary embodiment wherein the analog pixel signal and the digital pixel signal are generated based on the visible light and the near infrared signal, analog pixel signals are collectively called an analog pixel signal (R, G, B, IR), digital pixel signals are collectively called a digital pixel signal (R, G, B, IR), visible light analog pixel signals are collectively called a visible light analog pixel signal (R, G, B), visible light digital pixel signals are collectively called a visible light digital pixel signal (R, G, B), near infrared light analog pixel signals are collectively called a near infrared light analog pixel signal (IR), and near infrared light digital pixel signals are collectively called a near infrared light digital pixel signal (IR).

The signal processor 4 applies various signal processes to the digital pixel signal (R, G, B, IR) to generate a luminance signal and a color signal. The luminance signal and the color signal are format-converted by the format conversion unit 5 (JPEG or MPEG) to be outputted (displayed or recorded). The memory 6 includes a DRAM (Dynamic Random Access Memory).

The signal processor 4 comprises a YC processing unit 4a, a pixel integration unit 4b, and a visible light/near infrared light dominance determination unit 4c. The YC processing unit 4a separates the digital pixel signal (R, G, B, IR) into a luminance signal and a color signal based on the memory 6. The YC processing unit 4a constitutes a luminance signal generation unit. The pixel integration unit 4b integrates/averages the digital pixel signal (R, G, B, IR), and applies processes, such as exposure adjustment and white balance adjustment, to the integrated/averaged digital pixel signal (R, G, B, IR). The visible light digital pixel signal (R, G, B) integrated/averaged by the pixel integration unit 4 is called an average value of the visible light digital pixel signal (R, G, B), and the near infrared light digital pixel signal (IR) integrated/averaged by the pixel integration unit 4 is called an average value of the near infrared light digital pixel signal (IR).

The visible light/near infrared light dominance determination unit 4c determines whether the average value of the visible light digital pixel signal (R, G, B) and the average value of the near infrared light digital pixel signal (IR) are larger or smaller than the other, and requests the YC processing unit 4a to select one of processing configurations for generating the luminance signal and the color signal based on a determination result thereby obtained. The YC processing unit 4a comprises a first processing configuration for signal generation $4a_1$ and a second processing configuration for signal generation $4a_2$. The first processing configuration for signal generation $4a_1$ is suitable for generating the luminance signal based on the visible light digital pixel signal obtained during daytime or in a first photographing environment substantially as bright as the daytime. The second processing configuration for signal generation $4a_2$ is suitable for generating the luminance signal based on the near infrared light digital pixel signal obtained in a second photographing environment darker than the first environment.

The luminance signal and the color signal outputted from the YC processing unit 4a (they are both digital signals) are transmitted to the format conversion unit 5. The YC processing unit 4a and the format conversion unit 5 both use the memory 6 as a working area when they process the signals. The external device 7 behind the format conversion unit 5 comprises the external recording medium 7a such as a memory card for recording still images and the monitor 7b (for example, liquid crystal display).

Figure 2:
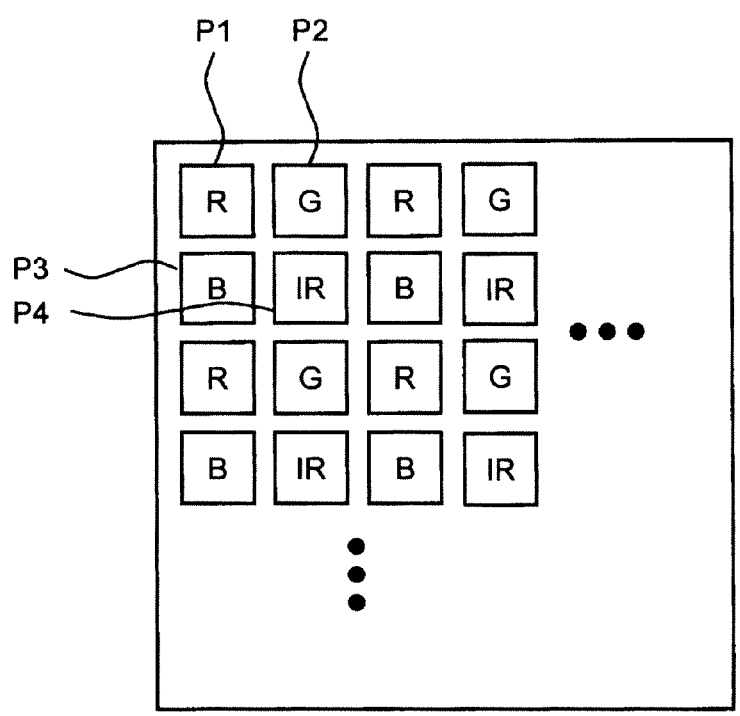
FIG. 2 illustrates an example of pixel layout in imaging elements according to exemplary embodiments 1 and 2 of the present invention.

FIG. 2 illustrates an example of pixel layout in the imaging element 2. Referring to FIG. 2, P1 is a pixel having a sensitivity to a red wavelength region (R), P2 is a pixel having a sensitivity to a green wavelength region (G), P3 is a pixel having a sensitivity to a blue wavelength region (B), and P4 is a pixel having a sensitivity to a wavelength region of near infrared light (IR). These pixels P1-P4 are horizontally and vertically arrayed in a matrix shape. The pixels P1-P3 constitute a plurality of pixels having a sensitivity to a first visible light wavelength region and configured to output the visible light analog pixel signal. The pixel P4 constitutes a plurality of second pixels having a sensitivity to a near infrared light wavelength region and configured to output the near infrared light analog pixel signal. Though the pixels respectively having the sensitivities to the wavelength regions of red, green, and blue are arrayed in the illustration, these pixels may have the sensitivities to any wavelength regions as far as they are the visible light wavelength regions. The four different pixels may be positioned differently from the illustration. The positions of the four pixels on the imaging element are not necessarily limited.

Hereinafter, an operation of the imaging device according to the present exemplary embodiment thus technically characterized is described. An optical image of a photographic subject having transmitted through the optical lens 1 is image-formed on the imaging element 2 and photoelectrically converted by the first pixels (visible light pixels) and the second pixels (near infrared light pixels). The analog pixel signal (R, G, B, IR) obtained by the imaging element 2 is digitized by the AD conversion unit 3 and outputted to the signal processor 4. The signal processor 4 integrates/averages the digital pixel signal (R, G, B, IR) obtained by the imaging element 2 and converted into the digital data by the AD conversion unit 3 to generate an average value $AV_{(R, G, B)}$ of the visible light digital pixel signal (R, G, B) and an average value $AV_{(IR)}$ of the near infrared light digital pixel signal. The average value $AV_{(R, G, B)}$ represents the signal level of the visible light digital pixel signal (R, G, B), and the average value $AV_{(IR)}$ represents the signal level of the near infrared light digital pixel signal (IR).

The average value$_{(R, G, B)}$ and the average value$_{(IR)}$ are transmitted to the visible light/near infrared light dominance determination unit 4c. The visible light/near infrared light dominance determination unit 4c compares the average value$_{(R, G, B)}$ and the average value$_{(IR)}$ to determine whether they are larger or smaller than the other, and selects, based on a determination result thereby obtained, one of the processing configurations for generating the luminance signal and the color signal (one or first and second processing configurations for signal generation $4a_1$ and $4a_2$) more suitable for an environment to which the determination result is outputted. Then, the visible light/near infrared light dominance determination unit 4c requests the YC processing unit 4a to switch to the selected processing configuration for signal generation. When the average value$_{(R, G, B)}$ is larger than the average value$_{(IR)}$ ($AV_{(R, G, B)} > A_{(IR)}$), it is determined that the photographing environment is during daytime or in the first photographing environment substantially as bright as the daytime (relatively bright environment). Then, the visible light/near infrared light dominance determination unit 4c requests the YC processing unit 4a to generate the luminance signal and the color signal in the first processing configuration for signal generation $4a_1$ (in which the luminance signal and the color signal are generated based on the visible light digital pixel signal (R, G, B, IR)). When the average value$_{(R, G, B)}$ is equal to or smaller than the average value$_{(IR)}$ ($AV_{(R, G, B)} \leq A_{(IR)}$), it is determined that the photographing environment is the second photographing environment darker than the first photographing environment (relatively dark environment). Then, the visible light/near infrared light dominance determination unit 4c requests the YC processing unit 4a to generate the luminance signal and the color signal in the second processing configuration for signal generation $4a_2$ (in which the luminance signal is generated based on the near infrared light digital pixel signal (IR), while the color signal is generated based on the visible light digital pixel signal (R, G, B, IR)). The YC processing unit 4a accordingly requested by the visible light/near infrared light dominance determination unit 4c processes the signals in the requested first or second processing configuration for signal generation $4a_1$, $4a_2$. When requested to switch to the first processing configuration for signal generation $4a_1$, the YC processing unit 4a generates the luminance signal and the color signal based on the visible light digital pixel signal (R, G, B). When requested to switch to the second processing configuration for signal generation $4a_2$, the YC processing unit 4a generates the luminance signal based on the near infrared light digital pixel signal (IR) and generates the color signal based on the visible light digital pixel signal (R, G, B). The processing configuration for signal generation is thus selected. The YC processing unit 4a uses the memory 6 as a working area for generating the luminance signal and the color signal.

The luminance signal and the color signal generated by the YC processing unit 4a are transmitted to the format conversion unit 5. The format conversion unit 5 format-converts (JPEG or MPEG) the luminance signal and the color signal so that these signals are displayed or recorded. The format conversion unit 5 uses the memory 6 as a working area for format-converting the luminance signal and the color signal. The format-converted image data is recorded on the external recording medium 7a or displayed on the monitor 7b.

Figure 3:
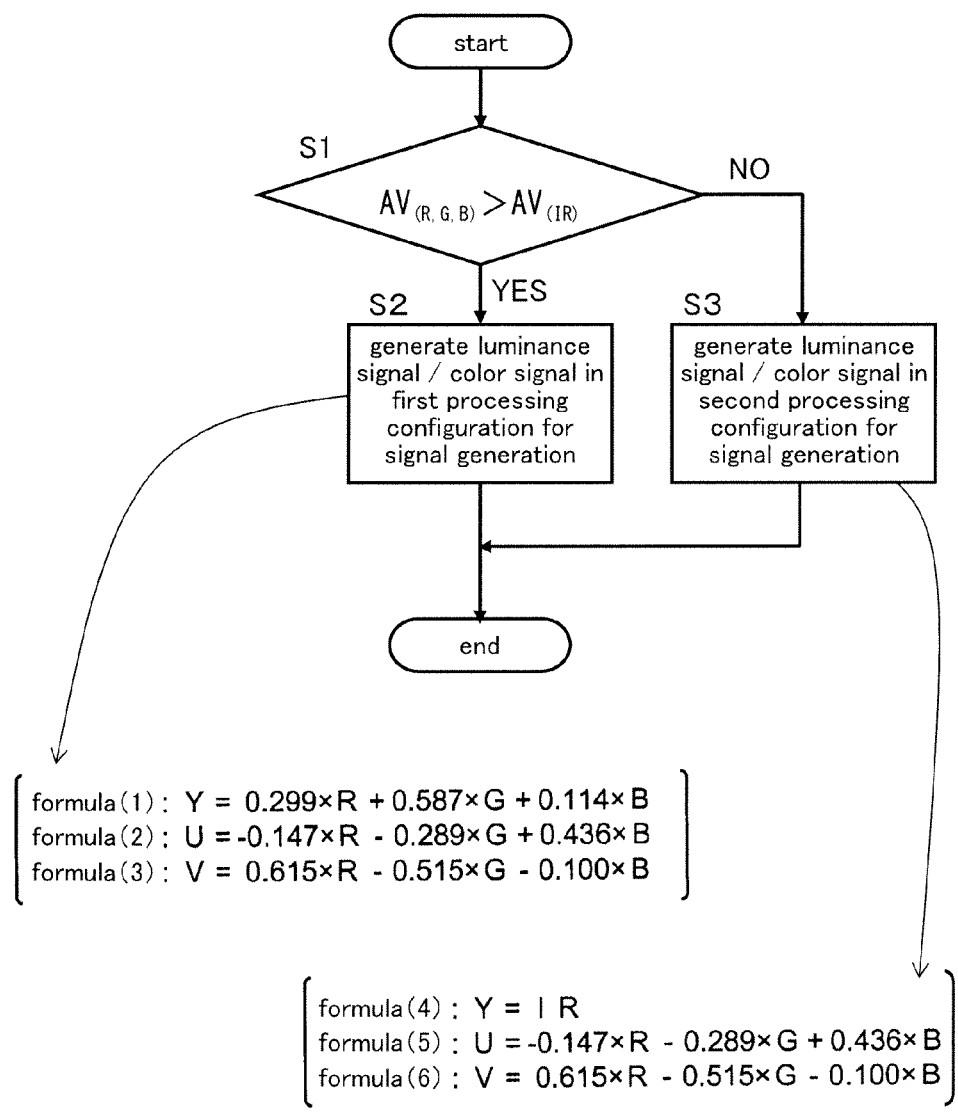
FIG. 3 is a flow chart illustrating processing steps for selecting a luminance signal calculation formula/a color signal calculation formula according to the exemplary embodiment 1.

FIG. 3 is a flow chart illustrating processing steps by the signal processor 4. The processing flow illustrated therein determines which of the first and second processing configurations for signal generation $4a_1$ and $4a_2$ (more specifically, luminance signal calculation formula and color signal calculation formula) by comparing the average value$_{(R, G, B)}$ of the visible light digital pixel signal (R, G, B) and the average value$_{(IR)}$ of the near infrared light digital pixel signal (IR) to determine whether they are larger or smaller than the other.

In Step S1, the visible light/near infrared light dominance determination unit 4c compares the average value$_{(R, G, B)}$ of the visible light digital pixel signal and the average value$_{(IR)}$ of the near infrared light digital pixel signal displayed on a screen to determine whether they are larger or smaller than the other. When the average value$_{(R, G, B)}$ is larger than the average value$_{(IR)}$ (AV$_{(R, G, B)}$>A$_{(IR)}$), the visible light/near infrared light dominance determination unit 4c determines that the image data was obtained in the first photographing environment and proceeds to Step S2. When the average value$_{(R, G, B)}$ is equal to or smaller than the average value$_{(IR)}$ (AV$_{(R, G, B)}$≤A$_{(IR)}$), the visible light/near infrared light dominance determination unit 4c determines that the image data was obtained in the second photographing environment and proceeds to Step S3.

Step S2 carried out after determining that the average value $_{(R, G, B)}$ is larger than the average value$_{(IR)}$ (AV$_{(R, G, B)}$>A$_{(IR)}$) is a step of generating the luminance signal and the color signal in the first processing configuration for signal generation 4a$_1$. In Step S2, the YC processing unit 4a calculates the luminance signal (Y) and the color signal (U, V) using the following calculation formulas 1)-3). The U and V are digital video signal components, corresponding to color different signals. "YUV" is called a luminance/color different multiplex signal.

$$Y=0.299 \times R+0.587 \times G+0.114 \times B \quad (1)$$

$$U=-0.147 \times R-0.289 \times G+0.436 \times B \quad (2)$$

$$V=0.615 \times R-0.515 \times G-0.100 \times B \quad (3)$$

Step S3 carried out after determining that the average value $_{(R, G, B)}$ is equal to or smaller than the average value$_{(IR)}$ (AV$_{(R, G, B)}$≤A$_{(IR)}$) is a step of generating the luminance signal and the color signal in the second processing configuration for signal generation 4a$_2$. In Step S3, the YC processing unit 4a calculates the luminance signal and the color signal using the following calculation formulas 4)-6).

$$Y=IR \quad (4)$$

$$U=-0.147 \times R-0.289 \times G+0.436 \times B \quad (5)$$

$$V=0.615 \times R-0.515 \times G-0.100 \times B \quad (6)$$

The formula 5) is the same as the formula 2), and the formula 6) is the same as the formula 3).

According to the present exemplary embodiment, when the visible light/near infrared light dominance determination unit 4c determines that the image data was obtained in the first photographing environment relatively bright, the YC processing unit 4a selects the first processing configuration for signal generation 4a$_1$ (in which the luminance signal and the color signal are generated based on the visible light pixel signal). When the visible light/near infrared light dominance determination unit 4c determines that the image data was obtained in the second photographing environment relatively dark, the YC processing unit 4a selects the second processing configuration for signal generation 4a$_2$ (in which the color signal is generated based on the visible light digital pixel signal, while the luminance signal is generated based on the near infrared light digital pixel signal). In the second environment relatively dark, there is more near infrared light components than the visible light. Therefore, the luminance signal generated from the near infrared light digital pixel signal obtained in the second environment has a larger signal level. Thus, the present exemplary embodiment tracks changes of the brightness level of the photographing environment, thereby selecting the processing configuration suitable for generating the luminance signal depending on the current brightness level.

This technical advantage enables a clear color image to be obtained in the second photographing environment relatively dark, thereby improving a degree of visibility for a user.

Exemplary Embodiment 2

In addition to the technical characteristic described in the exemplary embodiment 1, an imaging device according to an exemplary embodiment 2 of the present invention is configured to compare the visible light digital pixel signal to a given threshold value Th when the signal level of the visible light digital pixel signal is relatively small as compared to the near infrared light digital pixel signal and selects one of color signal generation configurations depending a comparison result thereby obtained.

As described earlier, the signal level of the visible light digital pixel signal (R, G, B) obtained in the second photographing environment is relatively small as compared to the signal level of the near infrared light digital pixel signal (IR). The signal level of the visible light digital pixel signal (R, G, B) thus obtained in the second photographing environment which is smaller than the signal level of the near infrared light digital pixel signal (IR) is larger than the given threshold value Th (hereinafter, called first visible light digital pixel signal (R, G, B)), or equal to or smaller than the given threshold value Th (hereinafter, called second visible light digital pixel signal). The second photographing environment where the first visible light digital pixel signal (R, G, B) is obtained may be rather dark, however, is not too dark, whereas the second photographing environment where the second visible light digital pixel signal (R, G, B) is obtained is definitely too dark. The present exemplary embodiment suitably selects one of different processing configurations for signal generation (2-1 processing configuration for signal generation, and 2-2 processing configuration for signal generation) for generating the two visible light digital pixel signals obtained in the different photographing environments.

Figure 4:
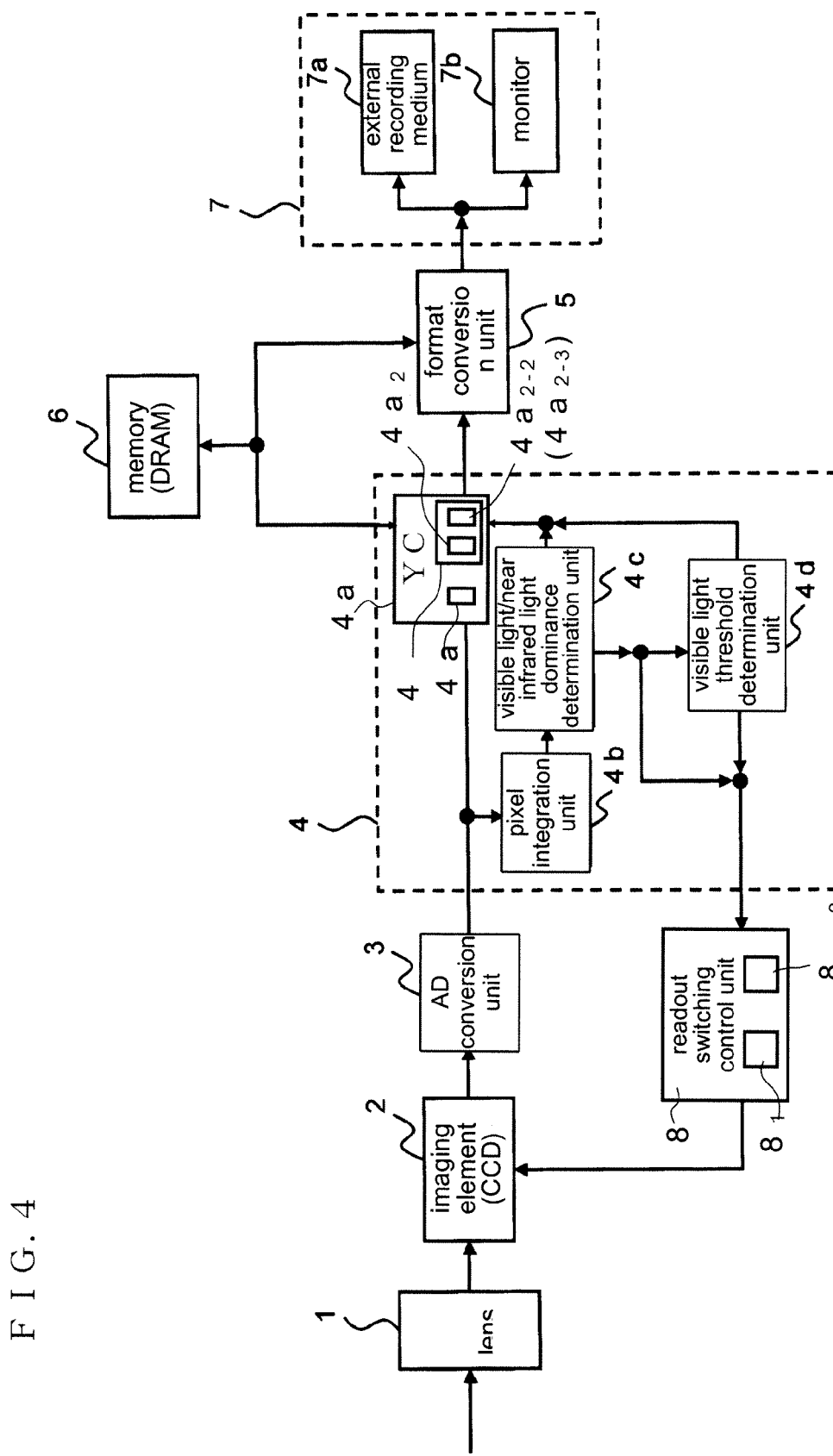
FIG. 4 is a block diagram illustrating a structural characteristic of an imaging device according to an exemplary embodiment 2 of the present invention.

FIG. 4 is a block diagram illustrating a structural characteristic of an imaging device according to the exemplary embodiment 2. The same reference symbols illustrated in FIG. 4 as those illustrated in FIG. 1 according to the exemplary embodiment 1 respectively denote the same structural elements, and description of these reference symbols is omitted. The present exemplary embodiment is structurally different in that a visible light threshold determination unit 4d and a readout switching control unit 8 are provided.

The visible light threshold determination unit 4d compares the signal level of the visible light digital pixel signal to the given threshold value Th, and outputs a determination result thereby obtained to the YC processing unit 4a and the readout switching control unit 8. The readout switching control unit 8 selects a readout configuration indicated by the determination result obtained by the visible light/near infrared light dominance determination unit 4c and the determination result obtained by the visible light threshold determination unit 4b, and accordingly reads out the analog pixel signal from the imaging element 2. There are two readout configurations selected by the readout switching control unit 8, which are a first readout configuration 8$_1$ in which the analog pixel signal is read per pixel and a second readout configuration 8$_2$ in which the analog pixel signal is read from a mixing result obtained by mixing a target pixel with its surrounding pixel. The two determination results indicate one of the first readout configuration 8$_1$ and the second readout configuration 8$_2$. The readout switching control unit 8 reads the analog pixel signal from the imaging element 2 according to one of the first readout configuration 8$_1$ and the second readout configuration 8$_2$ indicated by the two determination results. The YC processing unit 4a comprises a first processing configuration for signal generation $4a_1$ and a second processing configuration for signal generation $4a_2$ similarly to the exemplary embodiment 1. The second processing configuration for signal generation $4a_2$ of the YC processing unit $4a$ comprises a 2-1 processing configuration for signal generation $4a_{2-1}$ and a 2-2 processing configuration for signal generation $4a_{2-2}$.

The 2-1 processing configuration for signal generation $4a_{2-1}$ generates the luminance signal based on the near infrared light digital pixel signal read per pixel from the second pixels (near infrared light pixels), and generates the color signal based on the visible light digital pixel signal read per pixel from the first pixels.

The 2-2 processing configuration for signal generation $4a_{2-2}$ generates the luminance signal based on the near infrared light digital pixel signal obtained by the per-pixel readout from the second pixels (near infrared light pixels), and generates the color signal based on the visible light digital pixel signal obtained by the readout of a mixing result of a target pixel and its surrounding pixel both selected from the first pixels (visible light pixels).

The YC processing unit $4a$ switches to and from the first processing configuration, 2-1 processing configuration $4a_1$, and 2-2 processing configurations $4a_{2-1}$ and $4a_{2-2}$.

An operation of the imaging device according to the present exemplary embodiment thus technically characterized is described below. The description given below focuses on a part of the operation which is specific to the present exemplary embodiment. The visible light/near infrared light dominance determination unit $4c$ determines whether the average value $AV_{(R, G, B)}$ and the average value $AV_{(IR)}$ to determine whether they are larger or smaller than the other, and outputs an instruction based on the determination result to the YC processing unit $4a$, visible light threshold determination unit $4d$, and readout switching control unit $8$. The visible light threshold determination unit $4d$ starts its operation only when the determination result obtained by the visible light/near infrared light dominance determination unit $4c$ indicates that the average value $AV_{(R, G, B)} \leq$ the average value $AV_{(IR)}$. Therefore, the determination result of the visible light threshold determination unit $4d$, on which the determination result of the visible light/near infrared light dominance determination unit $4c$ is reflected, is ultimately the determination result of the two determination units $4c$ and $4d$.

The operation of the YC processing unit $4a$ according to the present exemplary embodiment when the determination result of the visible light/near infrared light dominance determination unit $4c$ indicates that average value $AV_{(R, G, B)} >$ average value $AV_{(IR)}$ is the operation based on the first processing configuration for signal generation $4a_1$, which is similar to the exemplary embodiment 1.

When the determination result of the visible light/near infrared light dominance determination unit $4c$ indicates that average value $AV_{(R, G, B)} \leq$ average value $AV_{(IR)}$, the visible light threshold determination unit $4d$ starts its operation to compare the average value $AV_{(R, G, B)}$ to the given threshold value Th. When the average value $AV_{(R, G, B)}$ is larger than the given threshold value Th (average value $AV_{(R, G, B)} >$ threshold value Th), the visible light threshold determination unit $4d$ requests the readout switching control unit $8$ and the YC processing unit $4a$ as follows.

The visible light threshold determination unit $4d$ requests the readout switching control unit $8$ to switch to the first readout configuration $8_1$ which is the per-pixel readout. The visible light threshold determination unit $4d$ requests the YC processing unit $4a$ to select the 2-1 processing configuration for signal generation $4a_{2-1}$ in which the luminance signal is generated from the near infrared light digital pixel signal read per pixel, and to select the 2-1 processing configuration for signal generation $4a_{2-1}$ in which the color signal is generated from the visible light digital pixel signal read per pixel. This operation is substantially the same as the operation according to the exemplary embodiment 1.

When the average value $AV_{(R, G, B)}$ is equal to or smaller than the given threshold value Th (average value $AV_{(R, G, B)} \leq$ threshold value Th), the visible light threshold determination unit $4d$ requests the readout switching control unit $8$ and the YC processing unit $4a$ as follows for generating the luminance signal and the color signal.

To Generate the Luminance Signal

The visible light threshold determination unit $4d$ requests the readout switching control unit $8$ to switch to the first readout configuration $8_1$ which is the per-pixel readout, and requests the YC processing unit $4a$ to switch to the 2-1 processing configuration for signal generation $4a_{2-1}$ which is the generation of the luminance signal based on the near infrared light digital pixel signal read per pixel.

To Generate the Color Signal

The visible light threshold determination unit $4d$ requests the readout switching control unit $8$ to switch to the second readout configuration $8_2$ which is the readout of the mixed target and surrounding pixels, and requests the YC processing unit $4a$ to switch to the 2-2 processing configuration for signal generation $4a_{2-2}$ which is the generation of the luminance signal based on the visible light pixel signal obtained by the readout of the mixed pixels. According to these requests, the luminance signal and the color signal are generated suitably for the photographing environment which is too dark.

Depending on the request by the visible light threshold determination unit $4d$, the readout switching control unit $8$ selects one of the readout configurations $8_1$ and $8_2$ to read out the pixel signal from the solid imaging element $2$. The YC processing unit $4a$ selects one of the processing configurations for signal generation $4a_1$, $4a_{2-1}$, and $4a_{2-2}$ to generate the luminance signal and the color signal as requested by the visible light/near infrared light dominance determination unit $4c$ and the visible light threshold determination unit $4d$.

The present exemplary embodiment is particularly advantageous when the photographing environment is too dark. The generation of the luminance signal when the photographing environment is too dark is similar to the exemplary embodiment 1. The first readout configuration $8_1$ which is the per-pixel readout is selected by the readout switching control unit $8$, and the 2-1 processing configuration for signal generation $4a_{2-1}$ in which the near infrared light digital pixel signal obtained by the per-pixel readout is used for signal generation is selected by the YC processing unit $4a$.

The generation of the color signal when the photographing environment is too dark is different to the exemplary embodiment 1. The second readout configuration $8_2$ in which the target pixel and its surrounding pixel are mixed is selected by the readout switching control unit $8$, and the 2-2 processing configuration for signal generation $4a_{2-2}$ based on the visible light digital pixel signal obtained by the readout of the mixed pixels is selected by the YC processing unit $4a$.

Though the visible light analog pixel signal used to generate the color signal when the photographing environment is too dark has a poor image solution due to the pixel mixing, it is not much of a problem because human eyes are not so sensitive to the color signal as to the luminance signal. The minor disadvantage is outweighed by the fact that the color signal thus obtained includes less noise because the visible light analog pixel signal can be more generated from the pixel mixing result. As a result, a color image thereby obtained has a relatively good image quality.

The pixel mixing is not employed in the near infrared analog pixel signal used to generate the luminance signal when the photographing environment is too dark, and the signal is normally obtained per pixel in the first readout configuration $8_1$ because there is more near infrared light components at night when there is less visible light, making it unnecessary to mix the pixels. When the signal is thus normally obtained in the first readout configuration $8_1$, the luminance signal generated from the near infrared light digital pixel signal does not undergo such a problem as degraded image solution. The rest of the operation, which is similar to the exemplary embodiment 1, is not described.

Figure 5:
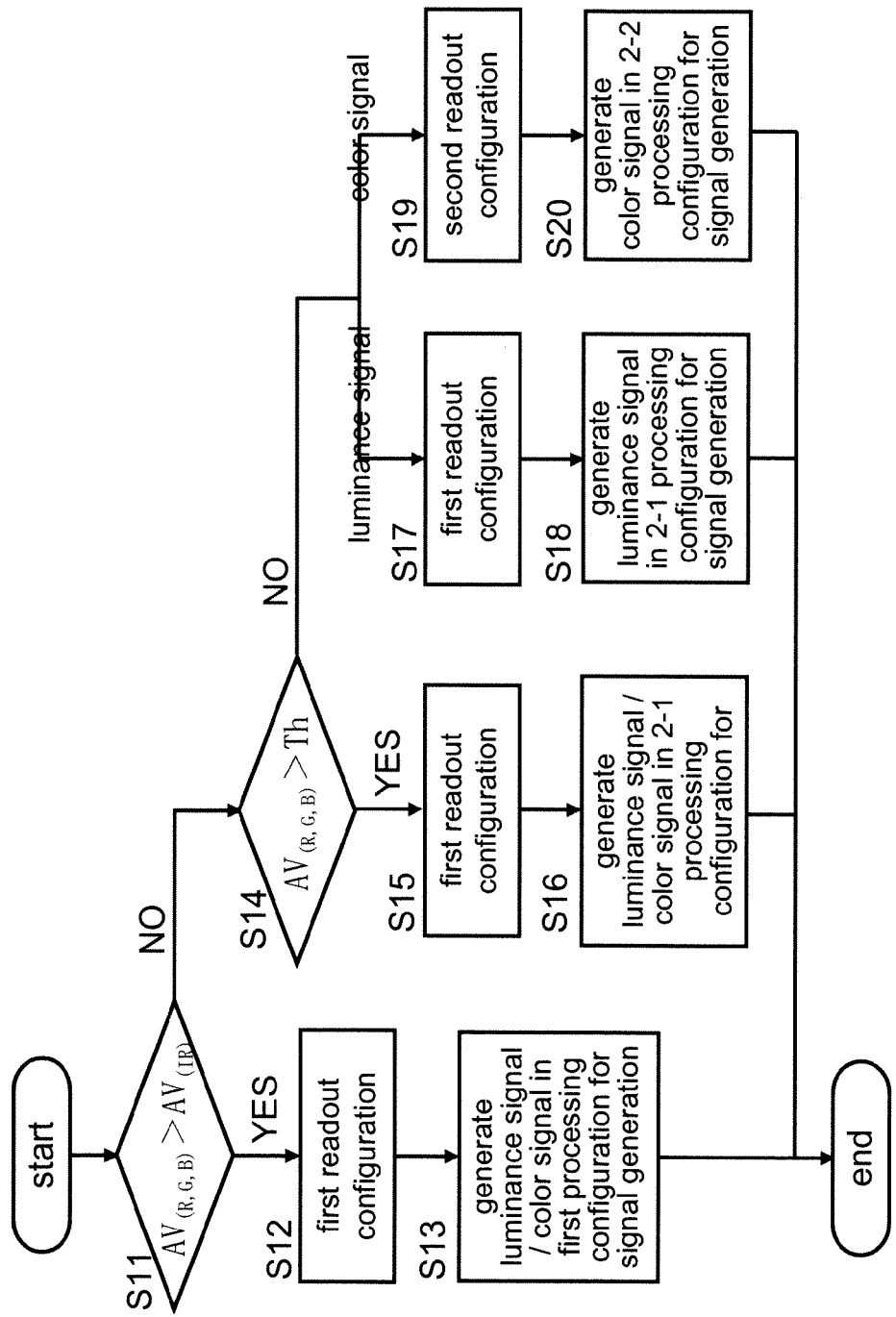
FIG. 5 is a flow chart illustrating processing steps for selecting a luminance signal calculation formula/a color signal calculation formula and readout configurations according to the exemplary embodiment 2.

FIG. 5 is a flow chart illustrating processing steps by the signal processor 4, wherein the processing steps by the visible light threshold determination unit 4d and the readout switching control unit 8 are added to the flow chart of FIG. 3. Step S11 is basically similar to Step 1, Step S13 is basically similar to Step 2, and Step S16 is basically similar to Step 3.

In Step S11, the visible light/near infrared light dominance determination unit 4c compares the average value $AV_{(R, G, B)}$ of the visible light digital pixel signal (R, G, B) and the average value $AV_{(IR)}$ of the near infrared light digital pixel signal to determine whether they are larger or smaller than the other. When the average value $AV_{(R, G, B)}$ is larger than the average value $AV_{(IR)}$ ($AV_{(R, G, B)} > AV_{(IR)}$), it is determined that the digital pixel signals are obtained in the photographing environment relatively bright, for example, during daytime (first photographing environment), and the processing proceeds to Step S12. When the average value $AV_{(R, G, B)}$ of the visible light pixel signal is equal to or smaller than the average value $AV_{(IR)}$ of the near infrared light pixel signal (IR) ($AV_{(R, G, B)} \leq AV_{(IR)}$), it is determined that the digital pixel signals are obtained in the photographing environment relatively dark, for example, at night (second photographing environment), and the processing proceeds to Step S14.

In Step S12 carried out after determining that the average value $AV_{(R, G, B)} > AV_{(IR)}$, the visible light threshold determination unit 4d requests the readout switching control unit 8 to execute the per-pixel readout in the first readout configuration $8_1$. The readout switching control unit 8 thus requested executes the per-pixel readout in the first readout configuration $8_1$ in the imaging element 2. After S12 is done, the processing proceeds to Step S13.

Step S13 is a step of generating the luminance signal and the color signal in the first processing configuration for signal generation $4a_1$. The signal generation in Step S13 is basically similar to Step S2 in the flow chart according to the exemplary embodiment 1 (FIG. 3).

In Step S14 carried out after determining that the average value $AV_{(R, G, B)} \leq AV_{(IR)}$, the visible light threshold determination unit 4d compares the average value $AV_{(R, G, B)}$ of the visible light digital pixel signal (R, G, B) to the given threshold value Th. When it is known from the comparison that the average value $AV_{(R, G, B)}$ is larger than the given threshold value Th (average value $AV_{(R, G, B)} >$ threshold value Th), the processing advances to Step S15. When it is known from the comparison that the average value $AV_{(R, G, B)}$ is equal to or smaller than the given threshold value Th (average value $AV_{(R, G, B)} \leq$ threshold value Th), the processing advances to Steps S17 and S19.

In Step S15 carried out after determining that the average value $AV_{(R, G, B)} >$ threshold value Th, the visible light threshold determination unit 4d requests the readout switching control unit 8 to execute the per-pixel readout in the first readout configuration $8_1$. The readout switching control unit 8 thus requested executes the per-pixel readout in the first readout configuration $8_1$ in the imaging element 2. After S15 is done, the processing proceeds to Step S16.

Step S16 is a step of generating the luminance signal and the color signal in the 2-1 processing configuration for signal generation $4a_{2-1}$. The signal generation in the 2-1 processing configuration for signal generation $4a_{2-1}$ in Step S16 is basically similar to Step S3 in the flow chart according to the exemplary embodiment 1 (FIG. 3) (signal generation in the second readout configuration $8_2$).

The processing steps carried out after determining that the average value $AV_{(R, G, B)} \leq$ threshold value Th are processing steps for generating the luminance signal (Steps S17 and S18), and processing steps for generating the color signal (Steps 19 and S20).

Processing Steps for Generating the Luminance Signal

In Step S17, the visible light threshold determination unit 4d requests the readout switching control unit 8 to execute the per-pixel readout in the first readout configuration $8_1$. The readout switching control unit 8 thus requested executes the per-pixel readout in the first readout configuration $8_1$ in the imaging element 2. S17 is followed by Step S18.

Step S18 is a step of generating the luminance signal in the 2-1 processing configuration for signal generation $4a_{2-1}$. In Step S18, the visible light threshold determination unit 4d requests the YC processing unit 4a to generate the luminance signal based on the near infrared light digital pixel signal (IR) obtained by the per-pixel readout. The YC processing unit 4a thus requested generates the luminance signal based on the near infrared light digital pixel signal (IR) obtained by the per-pixel readout.

Processing Steps for Generating the Color Signal

In Step S19, the visible light threshold determination unit 4d requests the readout switching control unit 8 to execute the readout by mixing the target pixel with its surrounding pixel in the second readout configuration $8_2$. The readout switching control unit 8 thus requested executes the readout by mixing the target pixel with its surrounding pixel in the second readout configuration $8_2$ in the imaging element 2. S19 is followed by Step S20.

Step S20 is a step of generating the luminance signal in the 2-2 processing configuration for signal generation $4a_{2-2}$. In Step S20, the visible light threshold determination unit 4d requests the YC processing unit 4a to generate the color signal based on the visible light digital pixel signal (R, G, B) obtained by the readout of the mixed target and surrounding pixels. The YC processing unit 4a thus requested generates the color signal based on the visible light digital pixel signal (R, G, B) obtained by the readout of the mixed target and surrounding pixels.

These processing steps are carried out in the case where the visible light digital pixel signal (R, G, B) is the first visible light digital pixel signal (R, G, B). As described earlier, the first visible light digital pixel signal (R, G, B) is a visible light digital pixel signal (R, G, B) having a signal level equal to or smaller than the given threshold value Th. The first visible light digital pixel signal (R, G, B) thus characterized is generated in the photographing environment too dark. The rest of the processing steps, which are similar to the exemplary embodiment 1, are not described. Step 20 may employ a prolonged exposure to light in place of the pixel mixing, which will be described later.

The given threshold value Th should be decided depending on the sensitivity of the imaging element 2. Below is described a method of setting of the threshold value. Given a photographing environment (quantity of light, photographic subject) where the readout method needs to be changed, the average value $AV_{(R, G, B)}$ of the visible light digital pixel signal (R, G, B) in the pixel integration unit 4b is obtained through, for example, tests. Then, the given threshold value Th is decided based on the obtained average value $AV_{(R, G, B)}$.

Figure 6:
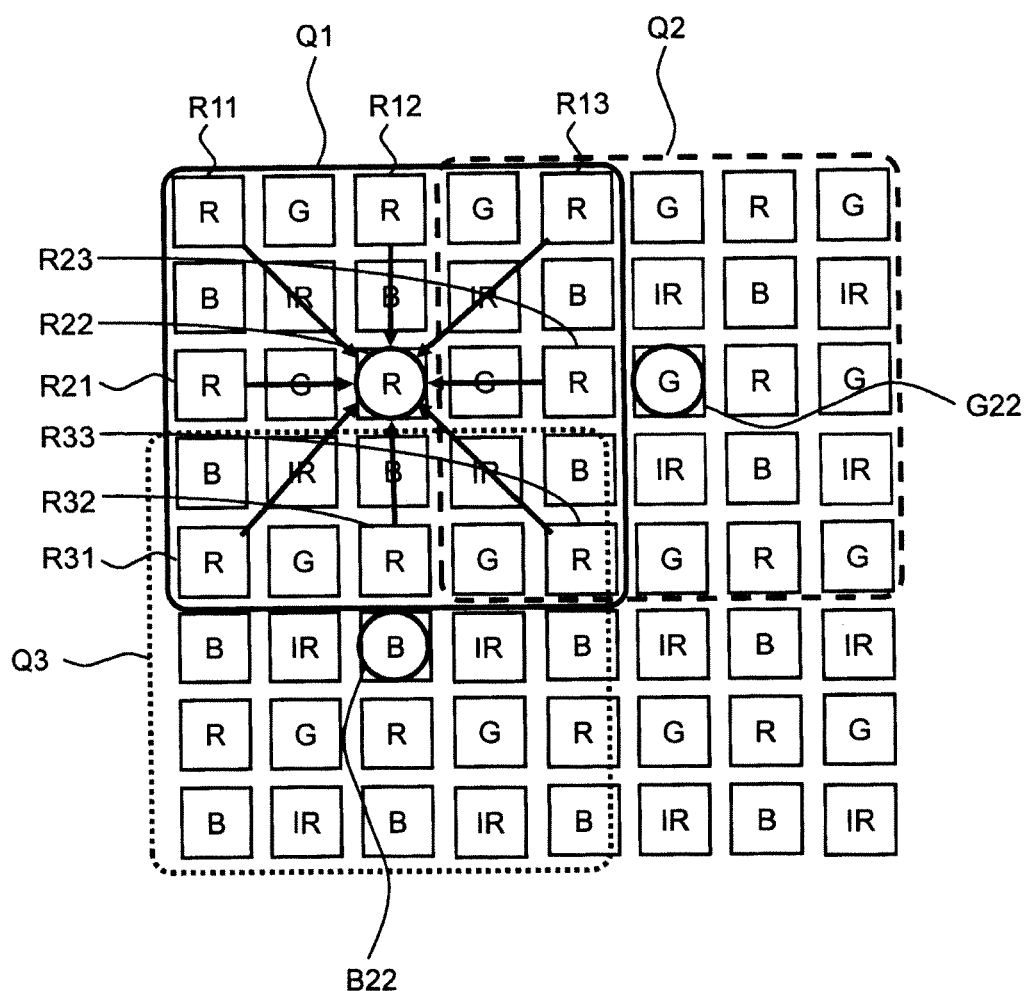
FIG. 6 illustrates mixing of nine pixels in an imaging element according to the exemplary embodiment 2.

FIG. 6 illustrates a pixel layout example of the imaging element when nine visible light pixels alone are mixed in Step S20 in the flow chart of FIG. 5. In the illustration, pixel mixing regions where the visible light pixels are mixed respectively shift by three pixels in a row direction and by three pixels in a column direction. As a result, the pixel mixing regions are two-dimensionally arranged so as to sequentially overlap with one another.

In an R pixel mixing region Q1 includes R pixels. R11, R12, R13, R21, R22, R23, R31, R32, and R33, signals of the pixel R22 (target pixel) positioned at the center and eight pixels around the target pixel (surrounding pixels), which are nine pixels in total, are mixed, and a pixel signal R, which is a mixing result, is outputted. In a G pixel mixing region Q2 and a B pixel mixing region Q3, signals of a pixel (target pixel) positioned at the center and eight pixels around the target pixel (surrounding pixels), which are nine pixels in total, are similarly mixed, and signals G and B (G22, B22), which are mixing results of the respective regions, are outputted. The IR pixel (near infrared light pixel) is not the target of the pixel mixing but is normally obtained per pixel because there are more near infrared light components at night when there is less visible light, making it unnecessary to mix the pixels.

At the time, number of the near infrared light pixels (IR) which are normally readout and outputted and number of the visible light pixels (R, G, B) which are mixed and outputted are different to each other. Therefore, it is necessary to correct the difference by, for example, adjusting the signal levels of the visible light digital pixel signals (R, G, B) obtained from the pixels to be mixed, R11, R12, R13, R21, R23, R31, R32, and R33 to be equal to the signal level of the near infrared light digital pixel signal (IR) obtained from the pixel R22. As a result of the correction, the image resolution of the color signal may be degraded, which is not so much of a problem because human eyes are not so sensitive to the color signal as to the luminance signal. On the contrary, color information can be obtained from more visible light pixel signals in consequence of the pixel mixing, and a favorable color image can be thereby obtained. Because of the normal signal process for the IR pixel, there is no risk of deteriorating the image resolution of the luminance signal generated from the IR pixel.

Figure 7:
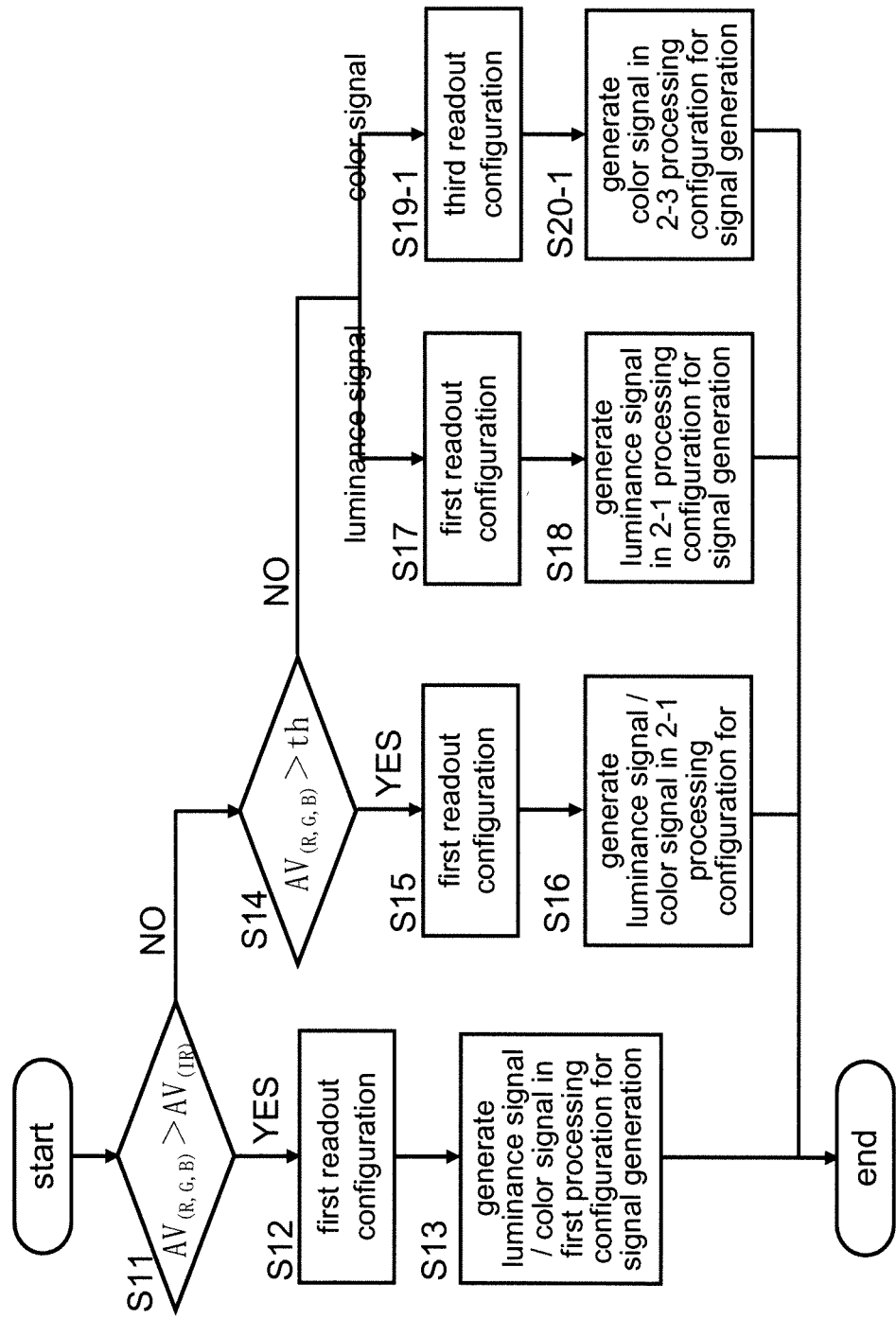
FIG. 7 is a flow chart illustrating processing steps for selecting a luminance signal calculation formula/a color signal calculation formula and readout configurations according to the exemplary embodiment 2.
Figure 8:
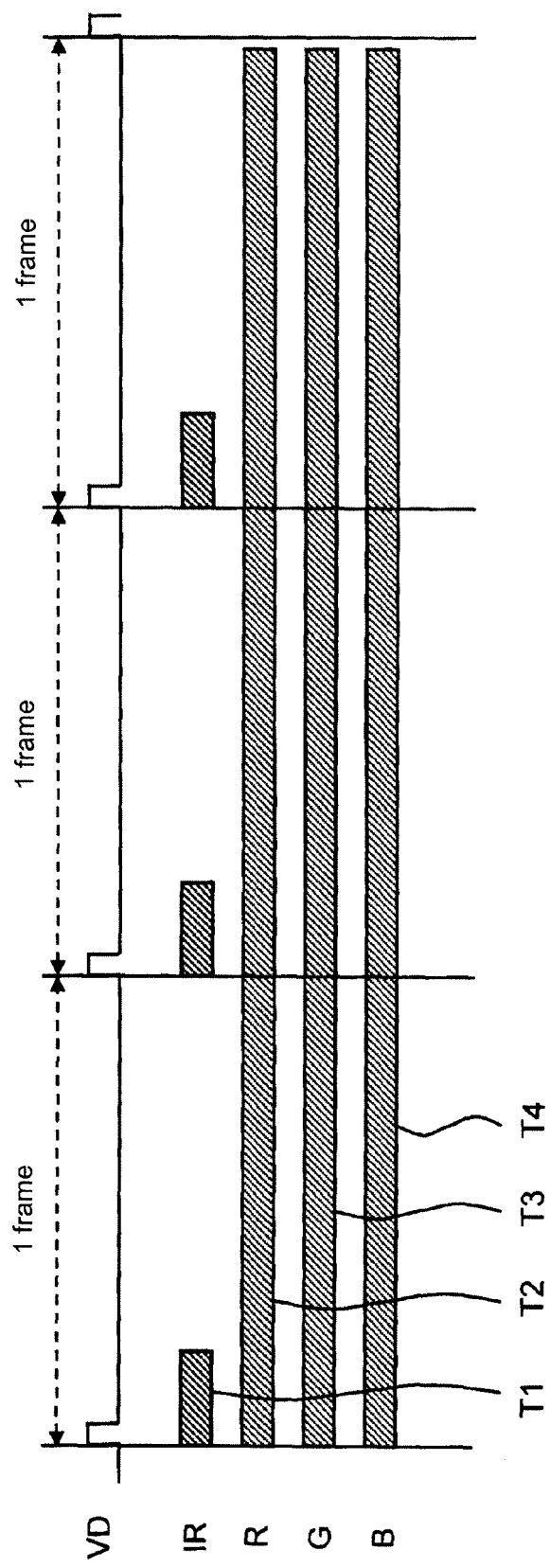
FIG. 8 is an illustration of a prolonged exposure to light in the imaging element according to the exemplary embodiment 2.
Figure 9:
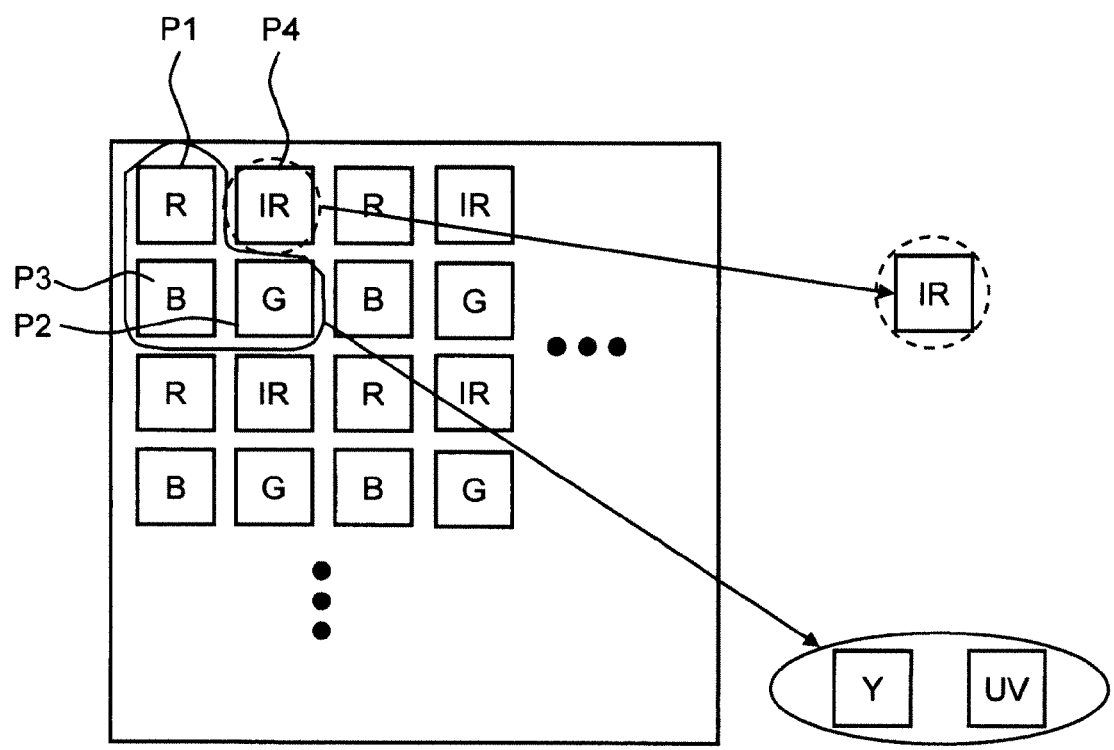
FIG. 9 is an illustration of a conventional imaging element.

FIG. 7 is a flow chart according to a modified embodiment of the present invention, including Step S19-1 (third readout configuration $8_3$) in place of Step S19 (second readout configuration $8_2$) illustrated in FIG. 5, and Step S20-1 (2-3 processing configuration for signal generation $4a_{2-3}$) in place of Step S20 (2-2 processing configuration for signal generation). FIG. 8 is an illustration of a prolonged exposure to light in the imaging element wherein the visible light pixels alone are subjected to the prolonged exposure to light by three frames.

In the third readout configuration $8_3$, the visible light analog pixel signal (R, G, B, IR) is readout after the imaging element 2 is subjected to exposure to light over a long period of time. In the 2-3 processing configuration for signal generation $4a_{2-3}$, the luminance signal is generated based on the near infrared light digital pixel signal read per pixel from the second pixels (near infrared light pixels) in the first readout generation $8_1$, while the color signal is generated based on the visible light digital pixel signal read from the first pixels (visible light pixels) after the prolonged exposure to light in the third readout configuration $8_3$.

In FIG. 8, T1 denotes an exposure time of the IR pixel, T2 denotes an exposure time of the R pixel, T3 denotes an exposure time of the G pixel, and T4 denotes an exposure time of the B pixel. Depending on whether the visible light pixel signal is larger or smaller than the given threshold value, the exposure time of the near infrared light pixel signal and the exposure time of the visible light pixel signal are regulated. The IR pixel is not the target of the prolonged exposure to light because there are more near infrared light components at night when there is less visible light, making it unnecessary to mix the pixels.

Because all of the visible light pixels are not outputted in any frame during the prolonged exposure to light, it is necessary for the signal processor 4 to check a current number of accumulated frames and make a correction such as adding the previous signal level in any frame where the signal readout fails, which deteriorates an update rate of the color signal. Similarly to the pixel mixing, this is not a serious issue because human eyes are not so sensitive to the color signal as to the luminance signal. On the contrary, color information can be calculated from the visible light pixel signals more generated through the prolonged exposure to light. As a result, a favorable color image can be obtained. Because of the normal signal process for the IR pixel, there is no risk of deteriorating the upgrade rate of the luminance signal generated from the IR pixel.

As described so far, the color signal can be most suitably generated depending on whether the visible light digital pixel signal is larger or smaller than the given threshold value Th. In a photographing environment too dark with less visible light, for example, during nighttime, the imaging element can have a certain degree of sensitivity so that an acceptably good image can be obtained. The imaging element, when particularly used in an in-vehicle camera or a monitor camera, provides a better visibility for a user.

The exemplary embodiments of the present invention were thus far described. However, the present invention is not necessarily limited to the exemplary embodiments and can be variously modified unless such modifications do the technical scope thereof.

Industrial Applicability

The technology according to the present invention is advantageous for obtaining a clear color image in a dark photographing environment, thereby providing a better visibility for a user in an imaging device comprising an imaging element provided with pixels having a sensitivity to wavelength regions of visible light and near infrared light, and particularly advantageous for an in-vehicle camera and a monitor camera. The technology is further applicable to all kinds of digital camera systems including a mobile camera.

DESCRIPTION OF REFERENCE SYMBOLS 1 optical lens
2 solid imaging element (visible light pixel and near infrared light pixel)
3 AD conversion unit
4 signal processor
4a YC processing unit
$4a_1$ first processing configuration for signal generation
$4a_2$ second processing configuration for signal generation
$4a_{2-1}$ 2-1 processing configuration for signal generation
$4a_{2-2}$ 2-2 processing configuration for signal generation
$4a_{2-3}$ 2-3 processing configuration for signal generation
4b pixel integration unit
4c visible light/near infrared light dominance determination unit 4d visible light threshold determination unit
5 format conversion unit
6 memory (DRAM)
7 external device
7a external recording medium
7b monitor
8 readout switching control unit
$8_1$ first readout configuration
$8_2$ second readout configuration
$8_3$ third readout configuration
P1 pixel having sensitivity to red wavelength region (R)
P2 pixel having sensitivity to green wavelength region (G)
P3 pixel having sensitivity to blue wavelength region (B)
P4 pixel having sensitivity to near infrared wavelength region (IR)
Q1 R pixels when nine pixels are mixed
Q2 G pixels when nine pixels are mixed
Q3 B pixels when nine pixels are mixed
T1 exposure time of IR pixel
T2 exposure time of R pixel
T3 exposure time of G pixel
T4 exposure time of B pixel

What is claimed is:

1. An imaging device configured to switch to and from generation of a luminance signal based on a visible light pixel signal and generation of a luminance signal based on a near infrared light pixel signal depending on a result of comparison of signal levels of the visible light pixel signal and the near infrared light pixel signal, the imaging device comprising:
a luminance signal generation unit, the luminance signal generation unit including:
a first processing configuration for signal generation suitable for the generation of the luminance signal based on the visible light pixel signal obtained during daytime or in a first photographing environment substantially as bright as the daytime; and
a second processing configuration for signal generation suitable for the generation of the luminance signal based on the near infrared light pixel signal obtained in a second photographing environment darker than the first photographing environment, wherein
the luminance signal generation unit switches to and from the first processing configuration for signal generation and the second processing configuration for signal generation depending on the comparison result of the signal levels of the visible light pixel signal and the near infrared light pixel signal.

2. The imaging device as claimed in claim 1, wherein
the luminance signal generation unit selects the first processing configuration for signal generation when the signal level of the visible light pixel signal is larger than the signal level of the near infrared light pixel signal, and
the luminance signal generation unit selects the second processing configuration for signal generation when the signal level of the visible light pixel signal is equal to or smaller than the signal level of the near infrared light pixel signal.

3. The imaging device as claimed in claim 2, comprising:
a plurality of first pixels having a sensitivity to a visible light wavelength region and configured to output the visible light pixel signal; and
a plurality of second pixels having a sensitivity to a near infrared light wavelength region and configured to output the near infrared light pixel signal, wherein
the second processing configuration for signal generation includes:
a 2-1 processing configuration for signal generation in which the luminance signal is generated based on the near infrared light pixel signal read per pixel from the second pixels, and a color signal is generated based on the visible light pixel signal read per pixel from the first pixels; and
a 2-2 processing configuration for signal generation in which the luminance signal is generated based on the near infrared light pixel signal read per pixel from the second pixels, and the color signal is generated based on the visible light pixel signal read from a mixing result obtained by mixing a target pixel with a surrounding pixel thereof both selected from the first pixels, and
the luminance signal generation unit selects the 2-1 processing configuration for signal generation when the signal level of the visible light pixel signal is equal to or smaller than the signal level of the near infrared light pixel signal and the signal level of the visible light pixel signal is larger than a given threshold value, and
the luminance signal generation unit selects the 2-2 processing configuration for signal generation when the signal level of the visible light pixel signal is equal to or smaller than the signal level of the near infrared light pixel signal and the signal level of the visible light pixel signal is equal to or smaller than the given threshold value.

4. The imaging device as claimed in claim 3, wherein
the luminance signal generation unit includes a 2-3 processing configuration for signal generation in place of the 2-2 processing configuration for signal generation, and
the luminance signal is generated based on the near infrared light pixel signal read per pixel from the second pixels, and the color signal is generated based on the visible light pixel signal read from the first pixels after a prolonged exposure to light in the 2-3 processing configuration for signal generation.

5. The imaging device as claimed in claim 3, wherein
the first pixels include:
a pixel having a sensitivity to a red visible light;
a pixel having a sensitivity to a green visible light; and
a pixel having a sensitivity to a blue visible light.

6. An imaging device comprising:
an imaging element capable of outputting a visible light pixel signal and a near infrared light pixel signal;
a YC processing unit capable of generating a luminance signal and a color signal from the visible light pixel signal and the near infrared light pixel signal; and
a visible light/near infrared light dominance determination unit configured to compare signal levels of the visible light pixel signal and the near infrared light pixel signal and switch to and from generation of the luminance signal based on the visible light pixel signal and generation of the luminance signal based on the near infrared light pixel signal depending on a comparison result thereby obtained,
wherein
the YC processing unit includes:
a first processing configuration for signal generation suitable for the generation of the luminance signal based on the visible light pixel signal outputted from the imaging element during daytime or in a first photographing environment substantially as bright as the daytime; and
a second processing configuration for signal generation suitable for the generation of the luminance signal based on the near infrared light pixel signal outputted from the imaging element in a second photographing environment darker than the first photographing environment, and the visible light/near infrared light dominance determination unit switches to and from the first processing configuration for signal generation and the second processing configuration for signal generation in the YC processing unit depending on the comparison result of the signal levels of the visible light pixel signal and the near infrared light pixel signal.

7. The imaging device as claimed in claim 6, wherein
the visible light/near infrared light dominance determination unit selects the first processing configuration for signal generation when the signal level of the visible light pixel signal is larger than the signal level of the near infrared light pixel signal, and the visible light/near infrared light dominance determination unit selects the second processing configuration for signal generation when the signal level of the visible light pixel signal is equal to or smaller than the signal level of the near infrared light pixel signal.

8. The imaging device as claimed in claim 6, wherein the imaging element comprises:
a plurality of first pixels having a sensitivity to a visible light wavelength region and configured to output the visible light pixel signal; and
a plurality of second pixels having a sensitivity to a near infrared light wavelength region and configured to output the near infrared light pixel signal, and
the first pixels include:
a pixel having a sensitivity to a red visible light;
a pixel having a sensitivity to a green visible light; and
a pixel having a sensitivity to a blue visible light.

9. The imaging device as claimed in claim 7, wherein the imaging element comprises:
a plurality of first pixels having a sensitivity to a visible light wavelength region and configured to output the visible light pixel signal; and
a plurality of second pixels having a sensitivity to a near infrared light wavelength region and configured to output the near infrared light pixel signal, and
the second processing configuration for signal generation includes:
a 2-1 processing configuration for signal generation in which the luminance signal is generated based on the near infrared light pixel signal read per pixel from the second pixels, and the color signal is generated based on the visible light pixel signal read per pixel from the first pixels; and
a 2-2 processing configuration for signal generation in which the luminance signal is generated based on the near infrared light pixel signal read per pixel from the second pixels, and the color signal is generated based on the visible light pixel signal read from a mixing result obtained by mixing a target pixel with a surrounding pixel thereof both selected from the first pixels, and the visible light/near infrared light dominance determination unit requests the YC processing unit to switch to the 2-1 processing configuration for signal generation when the signal level of the visible light pixel signal is equal to or smaller than the signal level of the near infrared light pixel signal and the signal level of the visible light pixel signal is larger than a given threshold value, and the visible light/near infrared light dominance determination unit requests the YC processing unit to switch to the 2-2 processing configuration for signal generation when the signal level of the visible light pixel signal is equal to or smaller than the signal level of the near infrared light pixel signal and the signal level of the visible light pixel signal is equal to or smaller than the given threshold value.

10. The imaging device as claimed in claim 9, further comprising
a readout configuration switching unit; and
a visible light threshold determination unit, wherein
the readout switching control unit includes:
a first readout configuration in which the visible light pixel signal and the near infrared light pixel signal are read per pixel from the imaging element; and
a second readout configuration in which the visible light pixel signal and the near infrared light pixel signal are read from a mixing result obtained by mixing a target pixel with a surrounding pixel thereof both selected from the imaging element, and the readout switching control unit switches to and from the first readout configuration and the second readout configuration, and the visible light threshold determination unit requests the readout switching control unit to switch to the first readout configuration and requests the YC processing unit to switch to the 2-1 processing configuration for signal generation when the signal level of the visible light pixel signal is equal to or smaller than the signal level of the near infrared light pixel signal and the signal level of the visible light pixel signal is larger than a given threshold value, and when the signal level of the visible light pixel signal is equal to or smaller than the signal level of the near infrared light pixel signal and the signal level of the visible light pixel signal is equal to or smaller than the given threshold value, the visible light threshold determination unit requests the readout switching control unit to switch to the first readout configuration and requests the YC processing unit to switch to the 2-1 processing configuration for signal generation in order to generate the luminance signal, and the visible light threshold determination unit requests the readout switching control unit to switch to the second readout configuration and requests the YC processing unit to switch to the 2-2 processing configuration for signal generation in order to generate the color signal.

11. The imaging device as claimed in claim 9, wherein
the YC processing unit includes a 2-3 processing configuration for signal generation in place of the 2-2 processing configuration for signal generation, and
the luminance signal is generated based on the near infrared light pixel signal read per pixel from the second pixels, and the color signal is generated based on the visible light pixel signal read from the first pixels after a prolonged exposure to light in the 2-3 processing configuration for signal generation.

12. The imaging device as claimed in claim 10, wherein
the readout switching control unit includes a third readout configuration in place of the second readout configuration, and
the visible light pixel signal and the near infrared light pixel signal are read from the imaging element after a prolonged exposure to light in the third readout configuration.

13. A signal processing circuit for an imaging device configured to switch to and from generation of a luminance signal based on a visible light pixel signal and generation of a luminance signal based on a near infrared light pixel signal depending on a result of comparison of signal levels of the visible light pixel signal and the near infrared light pixel signal, wherein the luminance signal is generated based on the near infrared light pixel signal read per pixel from an imaging element, and a color signal is generated based on the visible light pixel signal read per pixel from the imaging element when the signal level of the visible light pixel signal is equal to or smaller than the signal level of the near infrared light pixel signal and the signal level of the visible light pixel signal is larger than a given threshold value, and the luminance signal is generated based on the near infrared light pixel signal read per pixel from the imaging element, and the color signal is generated based on the visible light pixel signal read from a mixing result obtained by mixing a target pixel with a surrounding pixel thereof both selected from the imaging element when the signal level of the visible light pixel signal is equal to or smaller than the signal level of the near infrared light pixel signal and the signal level of the visible light pixel signal is equal to or smaller than the given threshold value.

14. The signal processing circuit for an imaging device as claimed in claim 13, comprising a luminance signal generation unit, the luminance signal generation unit including:

a first processing configuration for signal generation suitable for the generation of the luminance signal based on the visible light pixel signal obtained during daytime or in a first photographing environment substantially as bright as the daytime; and a second processing configuration for signal generation suitable for the generation of the luminance signal based on the near infrared light pixel signal obtained in a second photographing environment darker than the first photographing environment, wherein the luminance signal generation unit switches to and from the first processing configuration for signal generation and the second processing configuration for signal generation depending on the comparison result of the signal levels of the visible light pixel signal and the near infrared light pixel signal.

15. The signal processing circuit for an imaging device as claimed in claim 14, wherein the luminance signal generation unit selects the first processing configuration for signal generation when the signal level of the visible light pixel signal is larger than the signal level of the near infrared light pixel signal, and the luminance signal generation unit selects the second processing configuration for signal generation when the signal level of the visible light pixel signal is equal to or smaller than the signal level of the near infrared light pixel signal.

16. The signal processing circuit for an imaging device as claimed in claim 15, wherein the second processing configuration for signal generation includes:

a 2-1 processing configuration for signal generation in which the luminance signal is generated based on the near infrared light pixel signal read per pixel from the imaging element, and the color signal is generated based on the visible light pixel signal read per pixel from the imaging element; and a 2-2 processing configuration for signal generation in which the luminance signal is generated based on the near infrared light pixel signal read per pixel from the imaging element, and the color signal is generated based on the visible light pixel signal read from a mixing result obtained by mixing a target pixel with a surrounding pixel thereof both selected from the imaging element, and the luminance signal generation unit selects the 2-1 processing configuration for signal generation when the signal level of the visible light pixel signal is equal to or smaller than the signal level of the near infrared light pixel signal and the signal level of the visible light pixel signal is larger than a given threshold value, and the luminance signal generation unit selects the 2-2 processing configuration for signal generation when the signal level of the visible light pixel signal is equal to or smaller than the signal level of the near infrared light pixel signal and the signal level of the visible light pixel signal is equal to or smaller than the given threshold value.

17. The signal processing circuit for an imaging device as claimed in claim 16, wherein the luminance signal generation unit includes a 2-3 processing configuration for signal generation in place of the 2-2 processing configuration for signal generation, and the luminance signal is generated based on the near infrared light pixel signal read per pixel from second pixels, and the color signal is generated based on the visible light pixel signal read from first pixels after a prolonged exposure to light in the 2-3 processing configuration for signal generation.

18. A signal processing circuit for an imaging device, comprising:

a YC processing unit capable of generating a luminance signal and a color signal from a visible light pixel signal and a near infrared light pixel signal obtained from an imaging element; and a visible light/near infrared light dominance determination unit configured to compare signal levels of the visible light pixel signal and the near infrared light pixel signal and switch to and from generation of the luminance signal based on the visible light pixel signal and generation of the luminance signal based on the near infrared light pixel signal depending on a comparison result thereby obtained wherein the YC processing unit includes:

a first processing configuration for signal generation suitable for the generation of the luminance signal based on the visible light pixel signal obtained in the imaging element during daytime or in a first photographing environment substantially as bright as the daytime; and a second processing configuration for signal generation suitable for the generation of the luminance signal based on the near infrared light pixel signal obtained in the imaging element in a second photographing environment darker than the first photographing environment, and the visible light/near infrared light dominance determination unit switches to and from the first processing configuration for signal generation and the second processing configuration for signal generation in the YC processing unit depending on the comparison result of the signal levels of the visible light pixel signal and the near infrared light pixel signal.

19. The signal processing circuit for an imaging device as claimed in claim 18, wherein the visible light/near infrared light dominance determination unit selects the first processing configuration for signal generation when the signal level of the visible light pixel signal is larger than the signal level of the near infrared light pixel signal, and the visible light/near infrared light dominance determination unit selects the second processing configuration for signal generation when the signal level of the visible light pixel signal is equal to or smaller than the signal level of the near infrared light pixel signal.

20. The signal processing circuit for an imaging device as claimed in claim 19, wherein the second processing configuration for signal generation includes:

a 2-1 processing configuration for signal generation in which the luminance signal is generated based on the near infrared light pixel signal read per pixel from the imaging element, and the color signal is generated based on the visible light pixel signal read per pixel from the imaging element; and a 2-2 processing configuration for signal generation in which the luminance signal is generated based on the near infrared light pixel signal read per pixel from the imaging element, and the color signal is generated based on the visible light pixel signal read from a mixing result obtained by mixing a target pixel with a surrounding pixel thereof both selected from the imaging element, and the visible light/near infrared light dominance determination unit requests the YC processing unit to switch to the 2-1 processing configuration for signal generation when the signal level of the visible light pixel signal is equal to or smaller than the signal level of the near infrared light pixel signal and the signal level of the visible light pixel signal is larger than a given threshold value, and the visible light/near infrared light dominance determination unit requests the YC processing unit to switch to the 2-2 processing configuration for signal generation when the signal level of the visible light pixel signal is equal to or smaller than the signal level of the near infrared light pixel signal and the signal level of the visible light pixel signal is equal to or smaller than the given threshold value.

21. The signal processing circuit for an imaging device as claimed in claim 20, further comprising:

a readout configuration switching unit; and a visible light threshold determination unit, wherein the readout switching control unit includes:

a first readout configuration in which the visible light pixel signal and the near infrared light pixel signal are read per pixel from the imaging element; and a second readout configuration in which the visible light pixel signal and the near infrared light pixel signal are read from a mixing result obtained by mixing a target pixel with a surrounding pixel thereof both selected from the imaging element, and the readout switching control unit switches to and from the first readout configuration and the second readout configuration, and the visible light threshold determination unit requests the readout switching control unit to switch to the first readout configuration and requests the YC processing unit to switch to the 2-1 processing configuration for signal generation when the signal level of the visible light pixel signal is equal to or smaller than the signal level of the near infrared light pixel signal and the signal level of the visible light pixel signal is larger than a given threshold value, and the visible light threshold determination unit requests the readout switching control unit to switch to the second readout configuration and requests the YC processing unit to switch to the 2-2 processing configuration for signal generation when the signal level of the visible light pixel signal is equal to or smaller than the signal level of the near infrared light pixel signal and the signal level of the visible light pixel signal is equal to or smaller than the given threshold value.

22. The signal processing circuit for an imaging device as claimed in claim 20, wherein the YC processing unit includes a 2-3 processing configuration for signal generation in place of the 2-2 processing configuration for signal generation, wherein the luminance signal is generated based on the near infrared light pixel signal read per pixel from the imaging element, and the color signal is generated based on the visible light pixel signal read from the imaging element after a prolonged exposure to light in the 2-3 processing configuration for signal generation.

23. The signal processing circuit for an imaging device as claimed in claim 21, wherein the readout switching control unit includes a third readout configuration in place of the second readout configuration, and the visible light pixel signal and the near infrared light pixel signal are read from the imaging element after a prolonged exposure to light in the third readout configuration.

* * * * *